United States Patent [19]

Jejelowo

[11] Patent Number: 5,639,835

[45] Date of Patent: Jun. 17, 1997

[54] POLYMERIZATION CATALYST SYSTEMS, THEIR PRODUCTION AND USE

[76] Inventor: Moses Olukayode Jejelowo, 3410 Park Springs La., Kingwood, Tex. 77345

[21] Appl. No.: 526,241

[22] Filed: Sep. 11, 1995

Related U.S. Application Data

[63] Continuation of Ser. No. 195,806, Feb. 14, 1994, abandoned.

[51] Int. Cl.$^6$ ............................. C08F 4/76; C08F 4/642
[52] U.S. Cl. ..................... 526/129; 526/130; 526/156; 526/160; 526/170; 526/901; 526/904; 526/943; 526/348.6; 502/152; 502/117; 502/103
[58] Field of Search ..................... 526/130, 123, 526/156, 170, 160, 129

[56] References Cited

U.S. PATENT DOCUMENTS

| | | | |
|---|---|---|---|
| 4,808,561 | 2/1989 | Welborn | 502/104 |
| 5,008,228 | 4/1991 | Chang | 502/111 |
| 5,064,802 | 11/1991 | Stevens et al. | 502/155 |
| 5,162,466 | 11/1992 | Karol et al. | 526/132 |
| 5,214,173 | 5/1993 | Jordan et al. | 536/8 |
| 5,241,025 | 8/1993 | Hlatky et al. | 526/129 |

OTHER PUBLICATIONS

Hawley's Condensed Chemical Dictionary, 11th Ed., Van Nostrand Reinhold New York, 1987; inside front cover.

Kaminsky et al., "Olefin Polymerization with Highly Active Soluble Zirconium Compounds Using Aluminoxane as Co-Catalyst", Makromol. Chem., Macromol. Symp. 3, 377-387 (1986).

Ahlers et al., "Variation of molecular weight distribution of polyethylenes obtained with homogeneous Ziegler–Natta catalysts", Makromol. Chem., Rapid Commun. 9, 457-461 (1988).

Soga et al., "Activation of SiO2-supported zirconocene catalysts by common trialkylaluminums", Makromol. Chem. 194, 3499-3504 (1993).

*Primary Examiner*—Mark Nagumo
*Attorney, Agent, or Firm*—Jaimes Sher; Paige Schmidt

[57] ABSTRACT

This invention is generally directed toward a supported catalyst system useful for polymerizing olefins. The invention particularly relates to a supported metallocene catalyst system that does not require an activator or cocatalyst for the polymerization of olefins.

10 Claims, No Drawings

POLYMERIZATION CATALYST SYSTEMS, THEIR PRODUCTION AND USE

This is a continuation of application Ser. No. 08/195,806, filed Feb. 14, 1994 now abandoned.

FIELD OF THE INVENTION

This invention relates to catalysts, catalyst systems and to methods for their production and use in olefin polymerization. The invention particularly relates to a supported metallocene catalyst system incorporates little or no activator or cocatalyst for the polymerization of olefins.

BACKGROUND OF THE INVENTION

In the past metallocene catalysts were employed together with an activator or cocatalyst to produce an active olefin polymerization catalyst. For example, W. Kaminsky, et. al., "Polymerization of Olefins With a Homogeneous Zirconium/Alumoxane Catalysts", Adv. Polyolefins [Proc. ACS Int. Symp.] Meeting Date 1985, 361–371. Edited by Seymour, et. al., Plenum: New York, N.Y.; published 1987 disclosed that cyclopentadienyl complexes of the general formula $Cp_2MR_2$ are by themselves active polymerization catalysts, where Cp is a cyclopentadienyl radical that is substituted or unsubstituted, M is Ti, Zr or Hf and R is an alkyl. When these homogeneous catalysts are contacted with an alkyl aluminum or alumoxane these catalysts are particularly active.

K. Soga, et. al., "Activation of $SiO_2$-Supported Zirconocene Catalysts by common trialkylaluminums", 194 Makromol. Chem. 3499–3504 (1993), described the deposition of a $Cp_2ZrCl_2$ metallocene on $SiO_2$ which has been reacted with a $Cl_2Si(CH_3)_2$ compound. This catalyst system is then introduced into an olefin polymerization process in the presence of an aluminum alkyl.

U.S. Pat. Nos. 5,162,466 and 5,214,173 discuss neutral cyclopentadienyl dicarbollide unsupported complexes of Ti, Zr and Hf as active polymerization catalysts in the absence of a cocatalyst. However, these complexes are very difficult and expensive to synthesize.

It would be highly desirable to have an active polymerization supported catalyst that can polymerize olefins without requiring an activator. A need exists in the industry for a simple catalyst system that does not require an activator to polymerize olefins.

SUMMARY OF THE INVENTION

The invention is generally directed toward a new polymerization catalyst system. In one embodiment, the invention provides for a catalyst system comprising a carrier and a metallocene compound comprising at least one halogen leaving group. In a preferred embodiment, the catalyst system of the invention incorporates little or no activator.

In another embodiment of the invention, there is provided a process for producing polyolefins by contacting olefin monomer, optionally with comonomer, in the presence of the catalyst system described above.

In yet another embodiment of the invention, a method for producing the catalyst system described above is provided.

DETAILED DESCRIPTION OF THE INVENTION

Introduction

This invention is generally directed toward a supported catalyst system useful for polymerizing olefins. As previously mentioned it is well known that metallocene catalyst compounds of the general formula $Cp_2MeA_2$ are active polymerization catalysts without a cocatalyst, where Cp is substituted or unsubstituted cyclopentadienyl moeity, Me is a transition metal, especially of Group 4, 5 and 6, and A is an alkyl leaving group. Where A is halogen, it is also believed that these metallocene compounds of the same general formula as above polymerize olefins only in the presence of a cocatalyst. Surprisingly, I have discovered that supporting on a carrier a metallocene compound comprising at least one halogen leaving group unexpectedly results in an active polymerization catalyst without requiring a cocatalyst or alkyl aluminum compound. Also, I have discovered that very low amounts of a Group 13 metal compound, for example an aluminum containing compound, can be used to increase the activity of the catalyst system of this invention. Typically in the art much more than a 1:1 mole ratio of a Group 13 metal compound to the transition metal of the metallocene compound is used. I have discovered that a ratio of less than 1:1 is effective.

Catalyst Systems and Methods for Their Production

The metallocene catalyst of the invention is a bulky ligand transition metal metallocene compound. The compound contains a multiplicity of bonded atoms, preferably carbon atoms, forming a group which can be cyclic. The bulky ligand is a cyclopentadienyl ligand or cyclopentadienyl derived ligand which can be mono- or poly-nuclear or any other ligand capable of η-5 bonding to the transition metal. One or more bulky ligands may be π-bonded to the transition metal atom. The transition metal atom may be a Group 4, 5 or 6 transition metal and/or a transition metal from the lanthanide and actinide series. Other ligands may be bonded to the transition metal, such as at least one halogen as a leaving group that is detachable from the transition metal. The catalyst is derivable from a compound of the formula

where L is a bulky ligand; A is at least one halogen leaving group, Me is a transition metal and m and n are such that the total ligand valency corresponds to the transition metal valency. Preferably the catalyst is four co-ordinate such that the compound is ionizable to a $1^+$ valency state.

The ligands L and A may be bridged to each other and if two ligands L and/or A are present, they may be bridged. The metallocene compound, may be full-sandwich compounds having two ligands L which may be cyclopentadienyl ligands or cyclopentadiene derived ligands or half-sandwich compounds having one ligand L, which is a cyclopentadienyl ligand or derived ligand.

For the purposes of this patent specification the term "metallocene" is defined to contain one or more cyclopentadienyl moiety in combination with a transition metal. In the preferred embodiment, the metallocene compound of the invention comprises at least one Group 17/ halogen or halogen containing compound that is bonded to the transition metal of the metallocene compound.

In one embodiment the metallocene catalyst compound is represented by the general formula $(Cp)_mMeA_nR'_p$ wherein Cp is a substituted or unsubstituted cyclopentadienyl ring; Me is a Group 4, 5 or 6 transition metal; A is halogen and R' is independently selected as a halogen or hydrocarbyl or hydrocarboxyl groups having from 1–20 carbon atoms; m=1–3, n=1–3, p=0–3, and the sum of m+n+p equals the oxidation state of Me.

In another embodiment the metallocene catalyst component is represented by the formulas:

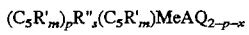

and

wherein Me is a Group 4, 5, 6 transition metal, $C_5R'_m$ is a substituted cyclopentadienyl, each R', which can be the same or different is hydrogen, alkenyl, aryl, alkylaryl or arylalkyl radical having from 1 to 20 carbon atoms or two carbon atoms joined together to form a part of a $C_4$ to $C_6$ ring, R" is one or more of or a combination of a carbon, a germanium, a silicon, a phosphorous or a nitrogen atom containing radical substituting on and bridging two $(C_5R'_m)$ rings, or bridging one $(C_5R'm)$ ring back to Me, when p=0 and x=1 otherwise "x" is always equal to 0, each Q which can be the same or different is an aryl, alkyl, alkenyl, alkylaryl, or arylalkyl radical having from 1 to 20 carbon atoms or halogen, Q' is an alkylidene radical having from 1–20 carbon atoms, A is a halogen, s is 0 or 1 and when s is 0, m is 5 and p is 0 or 1 and when s is 1, m is 4 and p is 1.

Various forms of the catalyst compounds of the metallocene type may be used in the polymerization process of this invention. Exemplary of the development of metallocene catalysts in the art for the polymerization of ethylene is the disclosure of U.S. Pat. No. 4,871,705 to Hoel, U.S. Pat. No. 4,937,299 to Ewen, et al. and EP-A-0 129 368 published Jul. 26, 1989, and U.S. Pat. Nos. 5,017,714 and 5,120,867 to Welborn, Jr. all of which are fully incorporated herein by reference. These publications teach the general structure of metallocene compounds and include alumoxane as the cocatalyst. None of these references disclose the catalyst system of this invention, one not requiring alumoxane cocatalyst.

Further, the metallocene catalyst compounds of the invention include monocyclopentadienyl heteroatom containing compounds. These types of catalyst compounds are described in, for example, PCT International Publication WO 92/00333 published Jan. 9, 1992, U.S. Pat. Nos. 5,057,475, 5,096,867, 5,055,438 and 5,227,440 and EP-A-0 420 436, WO 91/04257, all of which are fully incorporated herein by reference. Additionally, it is not beyond the scope of this invention that the catalyst compounds may be those described in U.S. Pat. No. 5,064,802 and PCT publications WO 93/08221 and WO 93/08199 published Apr. 29, 1993 all of which are herein incorporated by reference. The preferred transition metal component of the catalyst system of the invention are those of Group 4, particularly, zirconium, titanium and hafnium. The transition metal may be in any oxidation state, preferably +3 or +4 or a mixture thereof. All the catalyst systems of the invention may be, optionally, prepolymerized or used in conjunction with an additive or scavenging component to enhance catalytic productivity.

For purposes of this patent specification the term "carrier" or "support" can be any inorganic or organic support material, preferably a porous support, such as talc, inorganic oxides, inorganic chlorides, and resinous supports such as polyolefin or polymeric compounds. Suitable inorganic oxide materials which are desirably employed include Groups 2, 3, 4, 5, 13 or 14 metal oxides. In a preferred embodiment, the support material include silica, alumina, silica-alumina, and mixtures thereof. Other inorganic oxides that may be employed either alone or in combination with the silica, alumina or silica-alumina are magnesia, titania, zirconia, and the like. Other suitable support materials can be employed such as, finely divided polyolefins, such as polyethylene or polymeric compounds and inorganic compounds such as magnesium dichloride and the like.

It is preferred that the carrier of the catalyst of this invention has a surface area in the range of from about 10 to about 1000 $m^2/g$, pore volume in the range of from about 0.1 to about 2.5 cc/g and average particle size in the range of from about 10 to about 500μ. More preferably, the surface area is in the range of from about 50 to about 500 $m^2/g$, pore volume of from about 0.5 to about 2.0 cc/g and average particle size of from about 20 to about 200 μm. Most preferably the surface area range is from about 200 to about 400 $m^2/g$, pore volume form about 0.8 to about 2.0 cc/g and average particle size is from about 30 to about 100 μm.

In another embodiment where the carrier has hydroxyl groups, the carrier is treated chemically or calcined to a level such that a minimal number of these groups remain. In a preferred embodiment, where the carrier is silica or the like, the carrier is calcined to a temperature up to about 900° C., preferably in the range of between about 200° C. to about 850° C., more preferably about 400° C. to about 850° C., even more preferably about 600° C. to about 850° C. and most preferably about 700° C. to about 850° C.

In one embodiment the carrier is surface modified with surface modifying agents as described in U.S. Pat. No. 5,124,418 incorporated herein by reference.

In another embodiment, the porous carrier is optionally contacted with an organometallic compound such as lithium alkyls, magnesium alkyls, magnesium alkyl halides, aluminum alkyls, silicon alkyl, silicon alkoxides, silicon alkyl halides, and alumoxanes. The more preferred organometallic compounds are aluminum alkyls and magnesium alkyls. The most preferred organometallic compounds are alumoxanes and aluminum alkyls, for example, methylalumoxane (MAO), triethylaluminum (TEAL), trimethylaluminum (TMAL), tri-isobutylaluminum (TIBAL) and tri-n-hexylaluminum (TNHAL) and the like. The mole ratio of the amount of organometallic compound to the transition metal of the metallocene compound is generally less than 1:1, preferably less than 0.9 to 1, more preferably less than 0.6 to 1, even more preferably less than 0.4 to 1, still even more preferably less than 0.2 to 1 and most preferably less than 0.1 to 1.

In another embodiment, the catalyst system of the invention is substantially free of a Group 3 metal compound. The term "substantially free" is defined to be up to about 1.5 weight percent based on the total weight of the catalyst of a Group 13 metal compound and that the mole ratio of the metal of the Group 13 compound to the transition metal of the metallocene compound is less than 1:1. The catalyst systems of the invention preferably have less than 1.25 weight percent, more preferably less than 1 weight percent and most preferably less than 0.75 weight percent based on the total weight of the catalyst of a Group 13 metal compound.

In yet another embodiment, the catalyst system of the invention is free of any other component that materially activates the catalyst system of the invention. The term "free of any other component that materially activates" is defined to include any component that does not increase the overall activity of the catalyst system by more than 33 percent.

In yet another embodiment, the catalyst system contains no activating component (excluding the carrier) which associates with the metallocene compound in the degree that over 15 percent, more preferably 10 percent and most preferably about 5 percent of the metallocene in the catalyst system is associated with the component. Thus, if there is any inclusion of a scavenger or other component which does serve to activate individual metallocene compound molecules, such inclusion does not serve to activate over 15 percent, more preferably not over 10 percent, and most preferably not over 5 percent of the metallocene present in the catalyst system.

It is preferred that the catalyst system of the invention is prepared by contacting a carrier with a metallocene compound to form the final catalyst system.

In one embodiment in the method of the invention the final catalyst system is completed after a sufficient length of time for a majority of the metallocene compound to enter the porous support, the length of time can be between 0 to 10 minutes to 24 hours, preferably 30 minutes to 12 hours, more preferably 45 minutes to 6 hours, even more preferably 1½ hours to 3 hours and still even more preferably 1½ hours to 2½ hours and most preferably 1 hour to 2 hours.

In another embodiment the final catalyst system of the invention comprises at least 15 to 20 weight percent, preferably 10 to 15 weight percent, and most preferably 5 to 10 weight percent of the metallocene compound based on the total weight of the formed catalyst system. It is contemplated by the invention that the porous support is contacted with the metallocene compound in an inert solution and substantially dried. The inert solution can be for example, toluene, heptane, isopentane and mixtures thereof. The catalyst system of the invention is useful in a slurry state, but a semi-dried or dried state is preferred. It is also contemplated that the catalyst system once formed and substantially dried can be washed at least once in an inert solution that is either the same or different from the inert solution in which the catalyst was originally formed.

In one embodiment of the invention the metallocene catalyst system of this invention can be used in combination with at least one other metallocene well known in the art to further control the properties of the polymer desired. It is preferred that a mole ratio of the catalyst of this invention to the other catalyst is preferably 1:19 to 19:1, more preferably 1:3 to 3:1, still more preferably 1:2 to 2:1 and most preferably 1:1.

Polymerization Process

The catalyst system of this invention is suited for the polymerization of monomers and optionally comonomers in any polymerization or prepolymerization process, gas, slurry or solution phase; even a high pressure autoclave process can be utilized. In the preferred embodiment a gas phase process is utilized.

In the preferred embodiment, this invention is directed toward the gas phase polymerization or copolymerization reactions involving the polymerization or optionally prepolymerization of one or more of the alpha-olefin monomers having from 2 to 20 carbon atoms, preferably 2 to 12 carbon atoms. The invention is particularly well suited to the copolymerization reactions involving the polymerization of one or more of the monomers, for example alpha-olefin monomers of ethylene, propylene, butene-1, pentene-1, 4-methylpentene-1, hexene-1, octene-1, decene-1 and cyclic olefins such as styrene. Other monomers include polar vinyl, dienes, norbornene, acetylene and aldehyde monomers. Preferably a copolymer of ethylene or propylene is produced. Preferably the comonomer is an alpha-olefin having from 3 to 15 carbon atoms, preferably 4 to 12 carbon atoms and most preferably 4 to 10 carbon atoms. In another embodiment ethylene is polymerized with at least two comonomers to form a terpolymer and the like.

In one embodiment of the process of the invention, the olefin(s) are prepolymerized in the presence of the catalyst system of the invention prior to the main polymerization. The prepolymerization can be carried out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. No. 4,923,833 and 4,921,825 and EP-B-0279 863, published Oct. 14, 1992 all of which are incorporated fully herein by reference.

Typically in a gas phase polymerization process a continuous cycle is employed where in one part of the cycle, of a reactor, a cycling gas stream, otherwise known as a recycle stream or fluidizing medium, is heated in the reactor by the heat of polymerization. This heat is removed in another part of the cycle by a cooling system external to the reactor.

Generally in a gas fluidized bed process for producing polymer from monomers a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

The catalyst is introduced into the reactor via a catalyst feeder mechanism either continuously or intermittently as is known in the art. Usually the catalyst is contained in a vessel with a mechanism for controlling the quantity of catalyst to be injected into the reactor. Typically the catalyst is introduced into the reactor with a gas such as nitrogen or can be introduced as a slurry in a inert volatile solvent.

It is contemplated by this invention that temperature and pressure of the process in which the catalyst system of the invention is used can be manipulated to increase catalyst productivity.

Polymers, Products and Applications

In some instances where it is necessary to improve proccessability and adjust final end product characteristics the polymers produced by this present invention are blended or coextruded into single or multilayer films or the like with various other polymers well known in the art, for instance, LLDPE, LDPE, HDPE, PP, PB, EVA and the like. The polymers produced by the process of the invention are useful in such forming operations include film, sheet, and fiber extrusion and co-extrusion as well as blow molding, injection molding and roto molding. Films include blown or cast films in mono-layer or multilayer constructions formed by coextrusion or by lamination. Such films are useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fiber forming operations include melt spinning, solution spinning and melt blown fiber operations. Such fibers may be used in woven or non-woven form to make filters, diaper fabrics, medical garments, geotextiles, etc. General extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages and limitations thereof, the following examples are offered.

For the purposes of this patent specification the Mw (molecular weight) of a polymer is determined with a Waters Gel Permeation Chromatograph equipped with Ultrastyrogel columns and a refractive index detector. In this development, the operating temperatures of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.

Example 1

10 g of Davison 948 silica dehydrated to 850° C. was suspended in 60 cm³ hexane at 21° C. and a 20 cm³ toluene solution of 0.43 g ("PrCp)$_2$ZrCl$_2$ was added. After 1 h, the solvent was removed under vacuum to give a free-flowing powder. This resulted in a catalyst system containing 1 wt-% Zr. Elemental analysis of the silica showed it to contain 0.06 wt-% Al. This catalyst system of the invention has a mole ratio of Al:Zr of 0.2:1.

A 0.2 g sample of the 850° C. silica described above was added into a catalyst holding tube as a bottom layer of silica, to this was added 0.5 g of the silica-supported catalyst described above, then a second layer of 0.2 g of the 850° C. silica was added as a top layer such that the silica-supported metallocene was sandwiched between two layers of 850° C. treated silica. This catalyst holding tube was, meanwhile, clamped in place such that no shaking took place. This catalyst set-up was then admitted into a semi-batch gas-phase reactor under N$_2$ pressure. The reactor was not treated with any scavenger such as aluminum alkyls. A feed of 1-butene in ethylene was then admitted into the reactor at 100° C. The pressure in the reactor was held constant by continuously feeding 5 mol-% 1-butene in ethylene to compensate for any pressure change due to polymerization. After 1 h, 2 grams of polymer was recovered. The resulting polymer had Mw of 27,682.

Example 2

10 g of Davison 948 silica dehydrated to 850° C. was suspended in 100 cm³ heptane at 21° C. and a 25 cm³ toluene solution of 2.6 g ("PrCp)$_2$ZrCl$_2$ was added. After 4 h, the solvent was removed under vacuum to give a free-flowing powder. This resulted in a catalyst system containing 5 wt-% Zr. A sample (5 g) of this catalyst was suspended in 50 cm³ toluene and 1.6 cm³ of 10 wt-% methylalumoxane in toluene was added at 21° C. After 1 h, the resulting final catalyst was dried to free-flowing catalyst under vacuum. The catalyst system contained 1.2 weight percent Al based on the total weight of the catalyst system. This catalyst system of the invention has a mole ratio of Al:Zr of 0.9:1.

A 0.5 g of the silica-supported final catalyst described above was weighed into a catalyst holding tube. This catalyst holding tube was, meanwhile, clamped in place such that no shaking took place. This catalyst setup was then admitted into a semi-batch gas-phase reactor with a N$_2$ pressure. The reactor was not treated with a scavenger. A feed of 1-butene in ethylene was then admitted into the reactor at 85° C. The pressure in the reactor was held constant by continuously feeding 5 mol-% 1-butene in ethylene to compensate for any pressure change due to polymerization. After 1 h, 3 grams of polymer was recovered. The resulting polymer had a Mw of 125,098.

While the present invention has been described and illustrated by reference to particular embodiments, it will be appreciated by those of ordinary skill in the art that the invention lends itself to variations not necessarily illustrated herein. For example, it is not beyond the scope of this invention to mix at least two of the catalysts compounds or catalyst systems of the invention or to use the catalyst of the invention with any other catalyst or catalyst system known in the art, for example a traditional Ziegler-Natta catalyst or catalyst system or a metallocene/activator catalyst system, where the activators include ionic activators or alumoxanes or combinations thereof. It is also contemplated that metallocene compounds having other leaving groups other than halogen can be mixed with the catalysts of this invention. For this reason, then, reference should be made solely to the appended claims for purposes of determining the true scope of the present invention.

We claim:

1. A process for polymerizing and/or prepolymerizing olefins alone or in combination with one or more other olefins, said process comprising polymerizing and/or prepolymerizing said olefins in the presence of a catalyst system, said catalyst system consisting of the product of contacting at least one carrier, which consists of inorganic oxides or inorganic chlorides, with at least one transition metal metallocene compound comprising at least one halogen leaving group, and optionally organometallic compound wherein the mole ratio of the metal of the organometallic compound to the metal of the metallocene compound is less than 0.9.

2. The process of claim 1 wherein said carrier consists of an inorganic oxide.

3. The process of claim 1 wherein said carrier comprises at least one of the group consisting of silica and alumina, and wherein the organometallic compound is methylalumoxane.

4. The process of claim 1 wherein metallocene compound comprises a transition metal selected from Group 4, 5 or 6.

5. The process of claim 1 wherein the transition metal is zirconium, titanium or hafnium.

6. The process of claim 1 wherein the transition metal is zirconium.

7. The process of claim 1 wherein the metallocene compound comprises at least two halogens.

8. The process of claim 1 wherein the halogen is chlorine.

9. The process according to claim 1 wherein said metallocene compound is represented by one of the formulas:

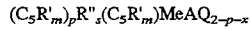

or

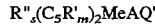

wherein Me is a Group 4, 5, 6 transition metal, $C_5R'_m$ is a substituted cyclopentadienyl, each R', which can be the same or different is hydrogen, alkenyl, aryl, alkylaryl or arylalkyl radical having from 1 to 20 carbon atoms or two carbon atoms joined together to form a part of a $C_4$ to $C_6$ ring, R" is one or more of or a combination of a carbon, a germanium, a silicon, a phosphorous or a nitrogen atom containing radical substituting on and bridging two ($C_5R'_m$) rings, or bridging one ($C_5R'm$) ring back to Me, when p=0 and x=1 otherwise "x" is always equal to 0, each Q which can be the same or different is an aryl, alkyl, alkenyl, alkylaryl, or arylalkyl radical having from 1 to 20 carbon atoms or halogen, Q' is an alkylidene radical having from 1–20 carbon atoms, A is a halogen, s is 0 or 1 and when s is 0, m is 5 and p is 0 or 1 and when s is 1, m is 4 and p is 1.

10. The process of claim 1 wherein said mole ratio is less than 0.4:1.

* * * * *